US010192413B1

(12) United States Patent
Luski et al.

(10) Patent No.: US 10,192,413 B1
(45) Date of Patent: Jan. 29, 2019

(54) THEFT DETERRENT SURVEILLANCE SYSTEM

(71) Applicant: Innotech Security, Inc., Pompano Beach, FL (US)

(72) Inventors: Moshe Luski, Cooper City, FL (US); Devin Benjamin, Pompano Beach, FL (US)

(73) Assignee: INNOTECH SECURITY, INC., Pompano Beach, FL (US)

( * ) Notice: Subject to any disclaimer, the term of this patent is extended or adjusted under 35 U.S.C. 154(b) by 168 days.

(21) Appl. No.: 15/335,173

(22) Filed: Oct. 26, 2016

Related U.S. Application Data

(60) Provisional application No. 62/246,406, filed on Oct. 26, 2015.

(51) Int. Cl.
*H04N 7/18* (2006.01)
*G08B 13/196* (2006.01)

(52) U.S. Cl.
CPC . *G08B 13/19628* (2013.01); *G08B 13/19695* (2013.01)

(58) Field of Classification Search
CPC .................... G08B 13/19628; G08B 13/19695
USPC .......................................................... 348/143
See application file for complete search history.

(56) References Cited

U.S. PATENT DOCUMENTS

| | | | | |
|---|---|---|---|---|
| 7,486,340 | B2 | 2/2009 | Lee et al. | |
| 2008/0186664 | A1 | 8/2008 | Chang et al. | |
| 2009/0279002 | A1 | 11/2009 | Xie | |
| 2013/0322013 | A1* | 12/2013 | Steele | A45C 11/00 361/679.55 |
| 2014/0176787 | A1* | 6/2014 | Sheng | H04N 5/2254 348/360 |
| 2014/0362223 | A1 | 12/2014 | LaCroix et al. | |
| 2015/0134641 | A1* | 5/2015 | Yokoyama | G06F 17/30011 707/722 |
| 2016/0343238 | A1* | 11/2016 | Olivares Arnaiz | H04W 4/02 |

* cited by examiner

*Primary Examiner* — Allen C Wong
(74) *Attorney, Agent, or Firm* — DLA Piper LLP US

(57) ABSTRACT

The present invention relates to security systems, and more particularly to a theft deterrent surveillance system comprised of a plurality of tablet type computers, each having a tablet holder that both protects the tablet and allows it to be mounted onto a supporting structure for hands-free use. The tablet holder preferably includes a video lens adapter which may be utilized to advance the video imaging quality or alter the field of view. The tablet security system allows each tablet to be mounted where needed in a commercial setting for use as a surveillance camera and recorder which may be wired or wirelessly linked to a local network and server.

17 Claims, 3 Drawing Sheets

THEFT DETERRENT SURVEILLANCE SYSTEM

PRIORITY CLAIM

In accordance with 37 C.F.R. 1.76, a claim of priority is included in an Application Data Sheet filed concurrently herewith. Accordingly, the present invention claims priority under 35 U.S.C. §§ 119(e), 120, 121, and/or 365(c) to U.S. Provisional Patent Application No. 62/246,406, entitled "A THEFT DETERRENT SURVEILLANCE SYSTEM", filed Oct. 26, 2015. The content of the above referenced application is incorporated herein by reference in its entirety.

FIELD OF THE INVENTION

This invention relates to a video surveillance system. More specifically, the present invention relates to a theft deterrent surveillance system that includes one or more tablet type computers, each having a tablet holder that protects and enhances the video lens field of vision while providing proper positioning of the tablet computer.

BACKGROUND OF THE INVENTION

Theft deterrent systems use a variety of components to monitor retail establishments for suspicious activity and to detect losses. These systems include components such as video cameras, recorders and public view monitors (PVM) mounted at exit and entry points of the retail establishments. The public view monitors display the video from the video cameras to provide awareness to the consumers that they are under surveillance as part of a loss prevention strategy. Unfortunately, the components that make up current theft deterrent systems are typically costly and require professional installation. Furthermore, these systems require a video recorder, a PVM and extensive cabling in order to provide awareness to the consumers that they are under surveillance. It would be advantageous to have a system wherein one component is capable of video recording and displaying the video.

Portable Electronic Devices (PEDs) are becoming more commonplace due to the increased needs for portable computing, remote communication and access to media content. Currently, PEDs include tablets, cell phones and personal digital assistants (PDAs). Of this group, tablets are preferred over cell phones and personal digital assistants for security due to their large screen size and high definition resolution, and are preferred over conventional laptops due to their compactness, light weight and lack of a keyboard and mouse. Tablets, while designed to be easily held for touch screen use, lack mounting structure or securing structure to hold the tablet in place in a permanent or semi-permanent manner. This is particularly disadvantageous when using a tablet as a replacement for a permanently-mounted dedicated video monitor. Thus, a theft deterrent surveillance system constructed from one or more tablet style computers in order to record and display the video being recorded is needed in the art.

Many advances in computer networking and processing technology have made it possible for portable electronic devices to include high resolution cameras that permit users to capture and record images and movies. In many cases, these images can be stored, processed, and transmitted for viewing through wired and wireless connections. However, there are many design constraints present with onboard cameras in communication devices that can limit the weight, size, expense, shape, adjustability, and overall quality of the lens system of such cameras. Consequently, many cameras in communication devices are inadequate for a wide variety of photographic needs, and thus limit the variety of photographic images that can be captured. Thus, most security systems choose instead to utilize permanently mounted cameras that include lenses dedicated to a particular type of image. These permanently mounted cameras are then coupled by wire to a recorder device, and further wired to a public view monitor which is used in conjunction with a mounting structure in order to record and display video to construct a security system. These systems are complex and expensive in nature, placing them out of reach for small business owners and the like.

Accordingly, it would be desirable to provide a simpler solution to the separated components that combine to form most current security systems. The system should be expandable to allow the user to grow his security system as needed. The system should be simple to allow the purchaser to install the system where needed within his/her business, and should be portable to allow the user to move the system should the need arise. Thus, the present system provides a system for using tablet type computers to construct a security system that includes a tablet holder for protecting the tablet and allowing it to be mounted to a supporting structure for hands-free use. The tablet holder may include a video lens adapter to advance and add variety to the video imaging quality and field of view. The tablet holder should also prevent thieves from manipulating, reconfiguring or disabling the tablet security system. The tablet security system should also include software that is easily networked, wherein a plurality of tablets can be mounted in a commercial setting and utilized as a complete video surveillance and security system that can be monitored from a central location. The system should also provide a point of sale monitor for deterring theft, and a recorder for video playback and evidence if prosecution of a theft is needed.

SUMMARY OF THE INVENTION

The present invention relates to security systems, and more particularly to a theft deterrent surveillance system comprised of a plurality of tablet type computers, each having a tablet holder that both protects the tablet and allows it to be mounted onto a supporting structure for hands-free use. The tablet holder preferably includes a video lens adapter which may be utilized to advance the video imaging quality or alter the field of view. The tablet security system allows each tablet to be mounted where needed in a commercial setting for use as a surveillance camera and recorder which may be wired or wirelessly linked to a local network and server.

Accordingly, it is an objective of the present invention to provide a tablet security system.

It is another objective of the present invention to provide a software package for the tablet type computers that allows multiple tablets to be wired or wirelessly networked together to create an entire security system.

Yet another objective of the present invention is to provide a mounting structure for a tablet type computer which allows the tablet to be secured within a retail environment in view of customers to provide a deterrent to theft.

Still yet another objective of the present invention is to provide a mounting structure that prevents customers from taking, manipulating or disabling the tablet, and thus the security system.

Still another objective of the present invention is to provide a mounting structure that allows alternative lenses to be utilized in conjunction with the preexisting lens of the tablet.

Another objective of the present invention is to provide a theft deterrent surveillance system that implements a monitoring and recording system using a plurality of tablets in conjunction with a local network and server.

Still yet another objective of the present invention is to provide a system wherein one component, the tablet, is capable of video recording and displaying the video image in real time.

Still yet another objective of the instant invention is to provide application software that allows the user to disable certain features on the tablet, limiting the tablet to recording and display of video.

A further objective of the present invention is to provide a tablet security system that can run for extended periods of time on internal battery power to provide security when power is unavailable.

An even further objective of the present invention is to provide a tablet security system that allows easy networking of a plurality of tablet security computers and may provide a central monitor.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
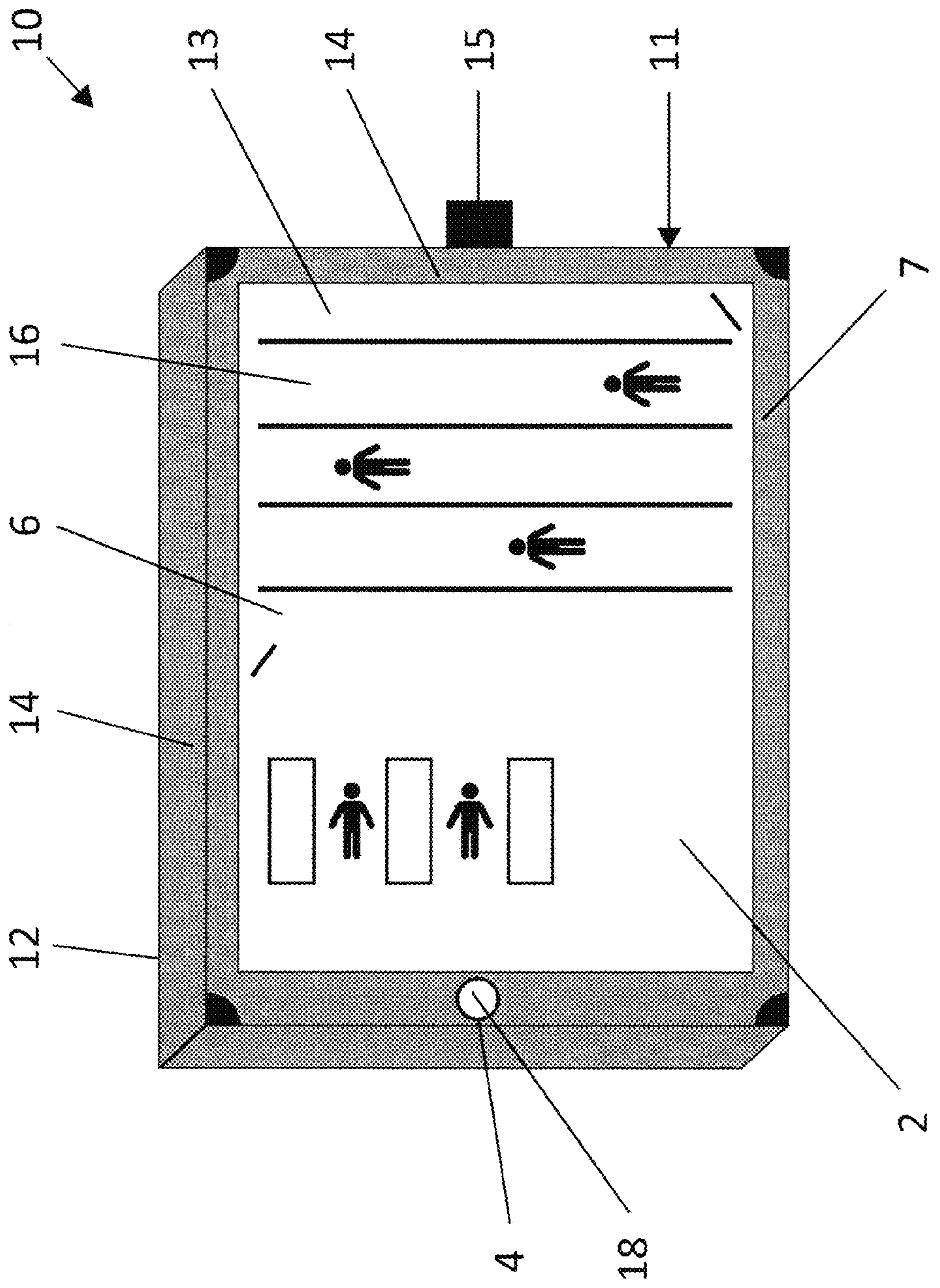
FIG. 1 is a pictorial representation of the anti-theft video surveillance system.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

As shown in FIG. 1, the tablet security system 10 is comprised of one or more tablet type computers 2 secured within a tamper resistant tablet holder 11. The tablet holder 11 preferably includes a bottom wall 12, four side walls 14, and an open face 16 which is constructed and arranged to encompass a tablet 2. However, in at least one embodiment, the tablet holder 11 is provided with a clear cover member 13 that prevents customers from touching the display surface of the tablet. The tablet holder 11 is preferably constructed from a robust material that is resistant to tampering. Such materials may include, but should not be limited to, plastics such as polycarbonate, metal, or suitable combinations thereof. On one side wall 14 is a video lens adapter 18 to advance the video imaging quality and field of view of the existing tablet lens 4 of a tablet 2, it is positioned in front of the existing tablet lens 4. The video lens adapter 18 is constructed in a manner to avoid impairing the existing video lens 4 while allowing interchangeability of the lenses. This construction provides the user with the ability to install telephoto, fisheye, wide angle, etc., lenses to enhance his/her personal security system. Motion detectors 15 or the like may also be incorporated into the tablet holder to reduce power consumption, particularly when the device is being operated solely from battery power. In one embodiment, the open face 16 circumscribes the tablet screen's peripheral edge 7, while wrapping around the front face sufficiently to prevent theft of the tablet. The open face 16 allows a clear view for consumers to view the images and video displayed on the tablet screen 6, while the included software prevents modification of monitoring and recording by disabling the touch screen. In this embodiment, the tablet may be configured so that the tablet can only be controlled through the network by an administrator, even though the computing and data storage is being completed within the tablet. A mounting bracket is included on the bottom wall outside surface for mounting to a support structure, not shown. The mounting bracket is preferably constructed to allow the tablet to be secured to shelving, displays, cash registers, ceilings, walls, etc., without hindering or impairing operation of the tablet. The mounting structure may include clamps, fasteners, clips, plates, tubing, flex joints, gimbals, hinges and the like, which allow the tablet to be oriented as desired for ease of viewing by customers. In addition, cables, locks and the like may be incorporated into the mounting structure to prevent theft or undesired relocation of the tablet itself.

Figure 2:
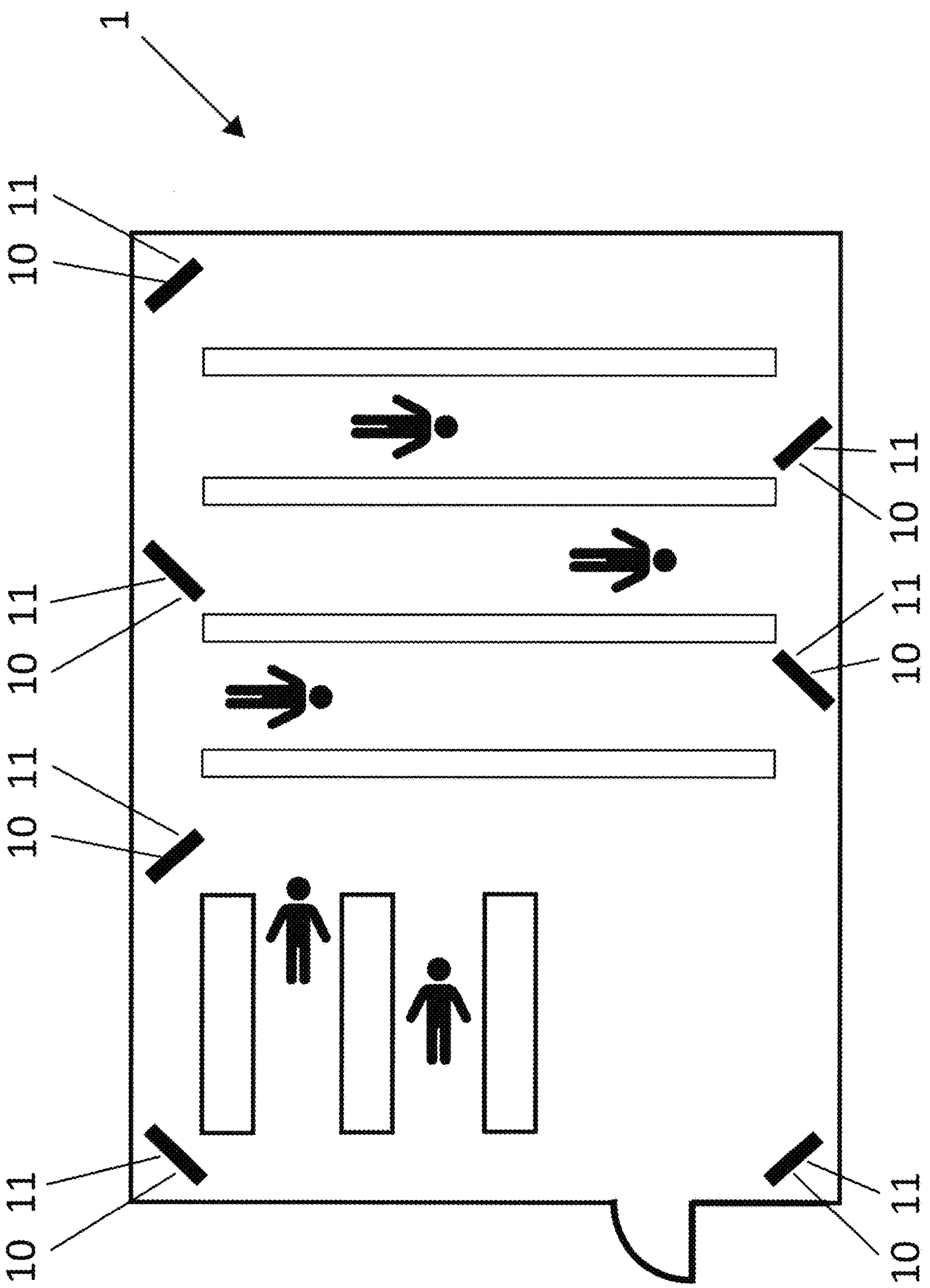
FIG. 2 is a plan view of multiple tablets and associated holders forming an anti-theft video surveillance system.

As shown in FIG. 2, the tablet holders 11 can be positioned anywhere in a commercial setting on a support structure. It is contemplated that the tablet holders 11 be placed within the field of view of consumers to provide awareness to the consumers that they are under surveillance.

Figure 3:
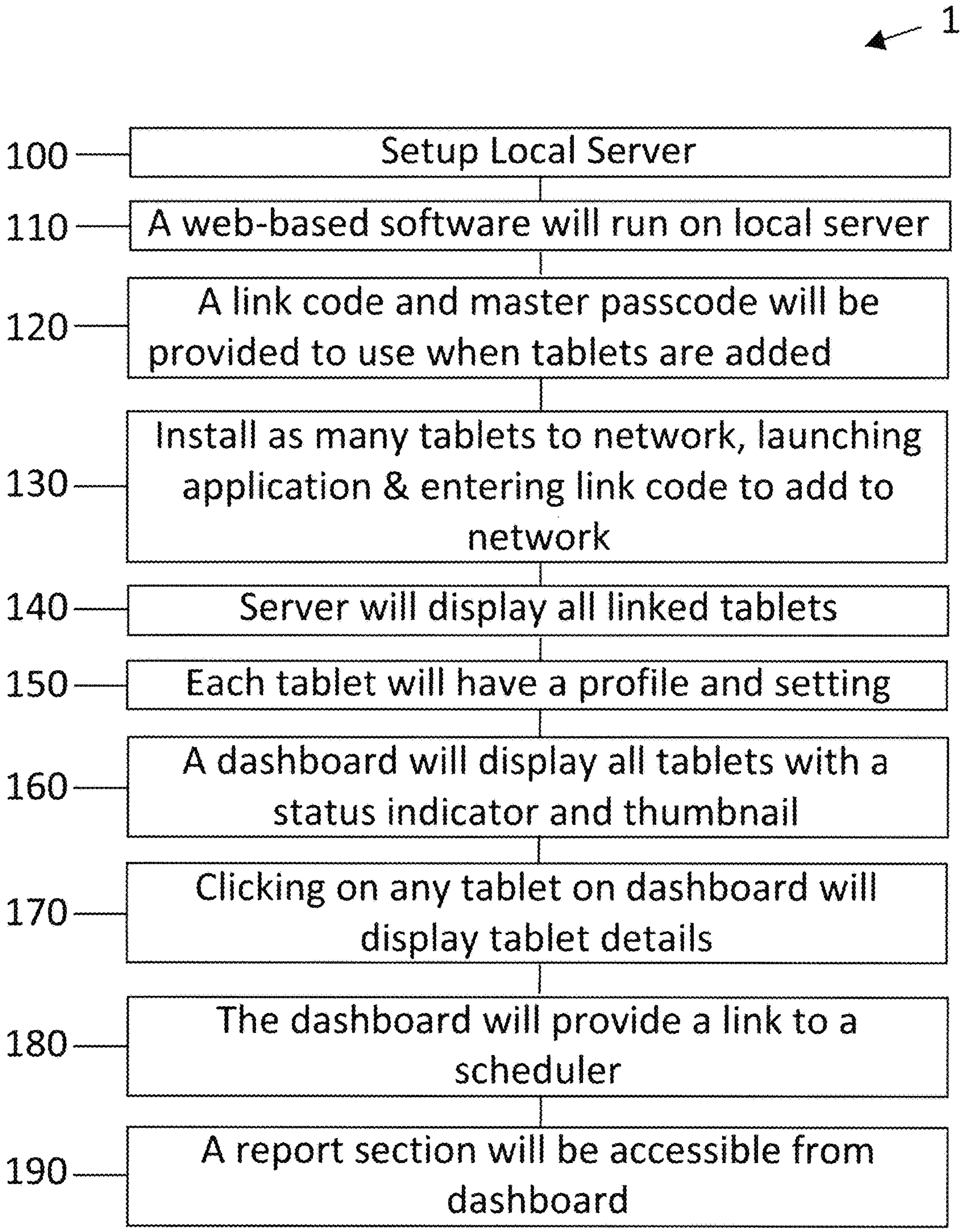
FIG. 3 is a flow chart of the anti-theft video surveillance system.

As shown in FIG. 3, the tablet security system 10 includes software for configuring the tablet for use in the security system. In general, the software includes the following steps: The user may set up a local server and local network 100 that does not interfere with any existing networks. Then, a web-based software will run on the local server 110. The software can be installed on a "Cloud" and linked via the internet from a remote access. A "link" code and "master" passcode will be provided to use when a plurality of tablets are added to the video surveillance system 120. Next, a plurality of tablets are installed and added to the network, thereby launching a software application 130. Upon launching the software application, the "link" code is entered and the tablet is added to the video surveillance system. Upon successful linking, the server will display all linked tablets on the video surveillance system 140. Each tablet will have a profile and setting 150. The profile and setting will include, but not be limited to, nickname, location, camera setting, and the like. A dashboard will display all the tablets with a status indicator, such as online or offline, and a report section, as well as a thumbnail of the latest video capture 160. The user can click on any of the tablet thumbnails in order to display the tablet detail section 170. The tablet detail section will provide access to the tablet profile, current video feeds, past video feeds, motion detection settings and alerts, and the like. The dashboard will also provide a link to the scheduler, where each tablet can be set to record at a specific time 180. The scheduler can include a calendar, whereby the user can add and edit entries to select a time, date, and range to record. The report section will display tablet status, activity reports from scheduled runs, motion detections, and the like 190. The software allows an administrator to configure the tablets individually or as a group. Configurations may include how and where the video is displayed to customers and administrators, how and where the data is recorded, activity of motion sensors and the timing of still or video captures.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A theft deterrent surveillance system, comprising:

at least one tablet-type computer, said tablet-type computer having a display screen and at least one camera lens, at least one data storage drive located within said at least one tablet-type computer, said at least one data storage drive storing video from said at least one camera lens while said theft deterrent surveillance system is active, said at least one tablet-type computer having a wireless internet connection to allow said at least one tablet-type computer to connect to an online data storage environment;

at least one holder, said holder having a bottom wall, two pairs of opposing side walls, and an open front area, said holder being constructed and arranged to encompass a tablet-type computer, said holder encompassing said at least one tablet-type computer such that said display screen of said at least one tablet-type computer being visible through said open front area of said at least one holder, said bottom wall having an outer surface including a mounting bracket, said mounting bracket constructed and arranged for mounting said holder to a support structure;

a video lens adapter positioned on said holder, said video lens adapter position corresponding to said at least one camera lens of said at least one tablet-type computer when said at least one tablet-type computer is encompassed within said at least one holder, said video lens adapter enhancing said at least one camera lens;

an online network connected to said at least one tablet-type computer, said online network running a software application on said at least one tablet-type computer, said online network connecting said at least one tablet-type computer to a server, said server running a web-based software, said server displaying all linked tablet-type computers on said theft deterrent surveillance system, said online network allowing a master user the ability to change settings on said at least one tablet-type computer through said software application; and a dashboard electronically connected to said server to display status indicators for said theft deterrent surveillance system.

2. The theft deterrent surveillance system of claim 1, further comprising a clear cover member connected to said two pairs of opposing side walls and extending across said open front area of said holder to protect said display screen when said tablet-type computer is encompassed within said holder.

3. The theft deterrent surveillance system of claim 1, wherein said holder is constructed from impact resistant materials to protect said at least one tablet-type computer when encompassed within said holder.

4. The theft deterrent surveillance system of claim 3, wherein said impact resistant materials are polycarbonate.

5. The theft deterrent surveillance system of claim 3, wherein said impact resistant materials are metal.

6. The theft deterrent surveillance system of claim 1, wherein said video lens adapter is a telephoto lens.

7. The theft deterrent surveillance system of claim 1, wherein said video lens adapter is a wide-angle lens.

8. The theft deterrent surveillance system of claim 1, wherein said video lens adapter is a fisheye lens.

9. The theft deterrent surveillance system of claim 1, wherein said video lens adapter is coupled to said holder by a video lens adapter bracket, said video lens adapter bracket allowing for interchangeability of different video lens adapters.

10. The theft deterrent surveillance system of claim 1, further including a motion detector, said motion detector connected to said tablet-type computer whereby said tablet-type computer is activated when said motion detector detects motion.

11. The theft deterrent surveillance system of claim 1, wherein said at least one tablet-type computer is a plurality of tablet-type computers.

12. The theft deterrent surveillance system of claim 1, wherein additional tablet-type computers can be added to the system when connected to said online network.

13. The theft deterrent surveillance system of claim 1, wherein said at least one tablet-type computer is wirelessly connected to said online network.

14. The theft deterrent surveillance system of claim 1, wherein said at least one tablet-type computer can be programmed to activate during specific times.

15. The theft deterrent surveillance system of claim 14, wherein said at least one tablet-type computer can be remotely programmed to activate during specific times.

16. The theft deterrent surveillance system of claim 15, wherein said at least one tablet-type computer programming is accessed through said dashboard.

17. The theft deterrent surveillance system of claim 1, wherein said dashboard provides access to said at least one tablet-type computer's current video feeds, past video feeds, and settings.

* * * * *